United States Patent
Saunders et al.

(10) Patent No.: US 6,708,412 B2
(45) Date of Patent: Mar. 23, 2004

(54) BENCH PLANE JOINTER FENCE

(75) Inventors: Terry Ross Saunders, North Tower (CA); Leonard G. Lee, Almonte (CA)

(73) Assignee: Lee Valley Tools, Ltd., Ottawa (CA)

( * ) Notice: Subject to any disclaimer, the term of this patent is extended or adjusted under 35 U.S.C. 154(b) by 136 days.

(21) Appl. No.: 09/934,503

(22) Filed: Aug. 22, 2001

(65) Prior Publication Data

US 2003/0037446 A1 Feb. 27, 2003

(51) Int. Cl.[7] .............................................. B26B 29/06
(52) U.S. Cl. ..................... 30/481; 30/294; 144/114.1; 248/683
(58) Field of Search ......................... 30/481, 289, 286, 30/282, 294, 478; 144/114.1, 36, 286, 134, 117.2, 117.3; 248/683

(56) References Cited

U.S. PATENT DOCUMENTS

| | | | | |
|---|---|---|---|---|
| 6,304 A | * | 4/1849 | Blye | 30/481 |
| 201,068 A | * | 3/1878 | Taylor | 30/481 |
| 228,766 A | * | 6/1880 | Kinney | 30/481 |
| 661,559 A | * | 11/1900 | Smith | 30/481 |
| 805,841 A | * | 11/1905 | Carson | 30/481 |
| 857,514 A | * | 6/1907 | Beasley | 30/481 |
| 1,057,582 A | | 4/1913 | Schade | |
| 1,361,125 A | * | 12/1920 | Willson | 30/481 |
| 2,752,963 A | * | 7/1956 | Streckert | 30/481 |
| 4,444,235 A | * | 4/1984 | Hott | 145/20 |
| 5,711,515 A | * | 1/1998 | Nishimura | 269/276 |

* cited by examiner

*Primary Examiner*—Allan N. Shoap
*Assistant Examiner*—Phong Nguyen
(74) *Attorney, Agent, or Firm*—Kilpatrick Stockton; John S. Pratt; Camilla C. Williams

(57) ABSTRACT

A bench plane jointer fence having a fence body secured to the side of any conventional ferromagnetic bench plane by two rare earth magnets mounted in the fence body and by the cooperation between a fence registration surface that bears against the sole of the plane and a repositionable stop screw. The fence is usable to facilitate planing of a workpiece edge square to an adjacent workpiece reference surface and may utilize a one-piece fence body. Planing of a workpiece edge at angles other than square to an adjacent workpiece reference surface is possible by pivoting a lower portion of the fence relative to an upper portion or, in the case of a one-piece fence body, by attachment of an auxiliary fence having a wedge-shaped cross section.

5 Claims, 2 Drawing Sheets

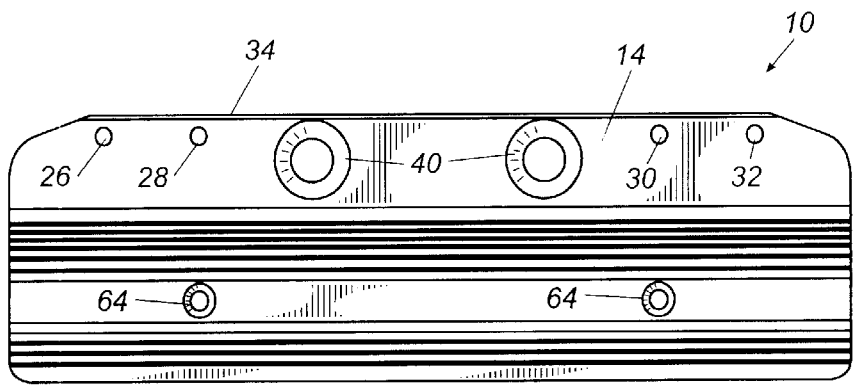
Fig. 3
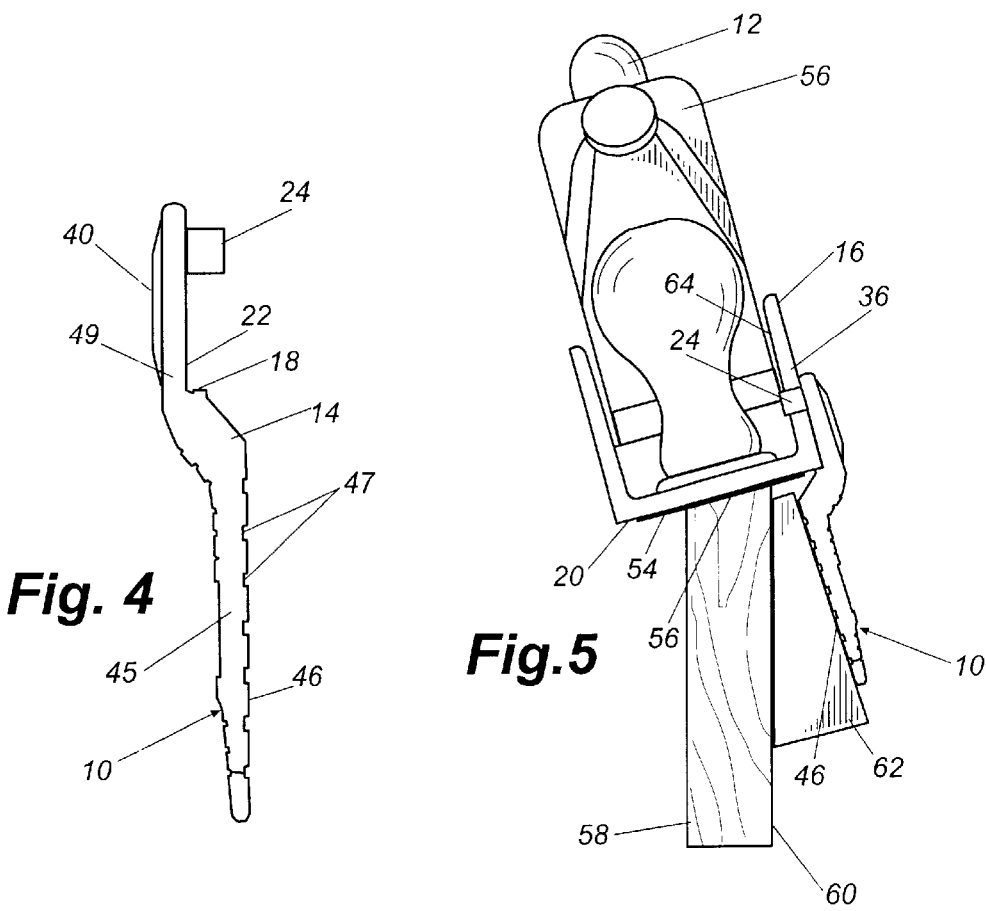
Fig. 4
Fig. 5

BENCH PLANE JOINTER FENCE

FIELD OF THE INVENTION

This invention relates to woodworking bench planes and auxiliary fences utilized with such planes.

BACKGROUND OF THE INVENTION

Bench planes and other planes are well known for use in woodworking. Generally, a plane blade is positioned in a plane body protruding through a sole that bears against a workpiece during plane use so that the blade will remove a shaving. Fences that bear against a face of the workpiece adjacent to the face being worked by the plane are also known. Such fences are virtually always used with some planes, and in other instances use of the fence is optional. Generally, bench planes are not supplied with fences, although it is frequently desired that a planed surface be oriented at a particular angle relative to an adjacent workpiece face. For instance, it is normally desirable that the edge of a board be formed at a right angle to one or both adjacent faces of the board. In practice, this is often accomplished through a trial and error process using a square to determine whether the board edge is "square" to an adjacent face. Auxiliary fences for jointer planes and other bench planes are known. For instance, the Stanley 386 fence was manufactured and sold during the first half of the twentieth century and was the subject of U.S. Pat. No. 1,057,582.

SUMMARY OF THE INVENTION

This invention is a bench plane jointer fence usually having a one-piece fence body that may be secured to the side of any conventional bench plane, preferably by rare earth magnets mounted in the fence body and by the cooperation between a fence registration surface that bears against the sole of the plane and a repositionable stop screw that bears against the top edge of the plane body side. The fence body is preferably fabricated of extruded aluminum so that an upper portion of the fence body lies against the plane side and a lower portion of the fence body is offset from the upper portion to position a workpiece registration surface parallel to the plane side but sufficiently inboard to be under the plane blade.

The rare earth magnets are positioned in steel magnet cups that concentrate their magnetic attraction on the face of the fence that abuts the plane side.

The stop screw is locatable in different positions to accommodate different lengths of planes and to enable use of the fence on either side of a bench plane. An auxiliary fence surface having a wedge-shaped cross section can be attached to the fence body in order to use it to form workpieces edges at non-square angles to an adjacent workpiece reference surface.

In an alternative embodiment, the workpiece registration surface can be adapted to pivot and lock in different angular positions relative to the portion of the fence attached to the plane. This permits adjustment to form workpiece edges at non-square angles to an adjacent workpiece reference surface without use of a wedge-shaped auxiliary fence member.

BRIEF DESCRIPTION OF THE DRAWINGS

FIG. 3 is a side elevation view of the jointer fence shown in FIG. 1 showing the outside of the fence.

FIG. 4 is an end elevation view of the jointer fence shown in FIG. 1.

FIG. 5 is an end elevation view of the jointer fence of this invention shown mounted on a bench plane and with a beveled block attached to the fence for forming a workpiece edge at an obtuse angle to an adjacent workpiece face.

DETAILED DESCRIPTION

Figure 1:
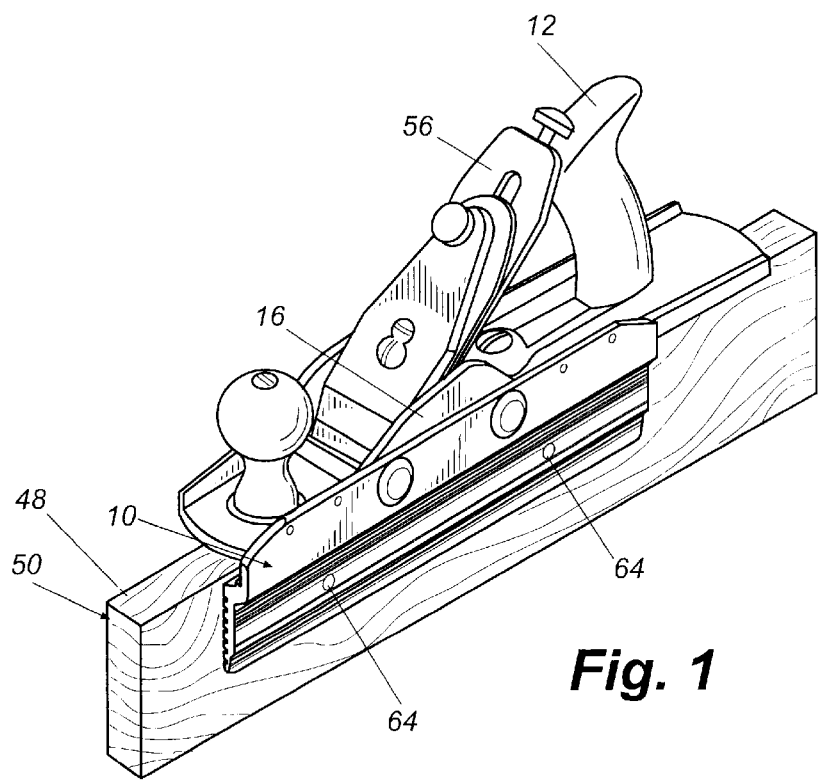
FIG. 1 is a perspective view of the jointer fence of this invention in position on a bench plane being used to plane an edge of a workpiece square to an adjacent face of the workpiece.

The bench plane jointer fence 10 of this invention is shown positioned on the left side of a bench plane 12 in FIG. 1. Fence 10 is also positionable on the right side of a bench plane.

Figure 2:
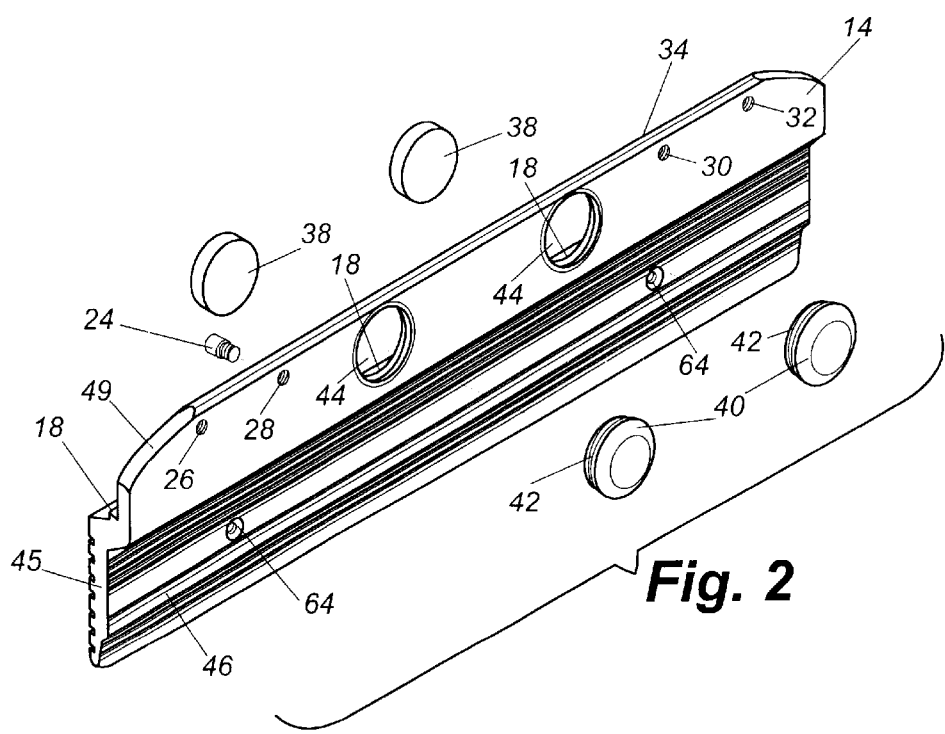
FIG. 2 is an exploded perspective view of the jointer fence shown in FIG. 1.

The components of fence 10, as may be easily understood by reference to FIG. 2, include a fence body 14, stop screw 24, and magnet 38 and cup 40 assemblies. Fence body 14 may be a section of extruded aluminum stock having the profile best seen in FIG. 4.

Fence body 14 is secured to one side 16 of a plane, such as bench plane 12 shown in FIG. 1 and oriented with respect to the bench plane and held in position as follows. Registration surface 18 (best seen in FIG. 4) contacts the sole 20 of bench plane 12 while the plane side contact surface 22 of fence body 14 bears against a side 16 of bench plane 12. Front to back movement of fence 10 along plane 12 is prevented by a stop screw 24 that is threaded into one of the small threaded apertures 26, 28, 30 or 32 near the upper edge 34 of fence body 14. The large cylindrical head of stop screw 24 contacts a leading edge 36 of bench plane side 16, thereby resisting movement of fence 10 toward the rear or down toward the sole of bench plan 12 while, in effect, clamping a portion of bench plane 12 side 16 between screw 24 and registration surface 18 on fence body 14. Contact between fence body 14 and bench plane 12 is maintained by the attraction for side 16 of plane 12 of disk shaped magnets 38 that are positioned flush with plane side contact surface 22 by receiving each of the magnets 38 in a magnet cup 40. Each magnet cup 40 is typically made of ferrous metal such as steel and has threads 42 for securing each magnet cup 40 in one of threaded holes 44 in fence body 14. Thus the side contact surface 22, registration surface 18, magnets 38, their cups 40 and stop screw 24 form an attachment assembly for securing fence 10 to plane 12.

The lower portion 45 of fence 10 carrying contact fence or workpiece registration surface 46 depends from this attachment assembly. In the preferred embodiment depicted in the drawings, this lower portion 45 is fixed relative to the fence attachment assembly by being integrally formed as part of the same fence body 14 upper portion 49 of which contact surface 22 and registration surface 18 are a part. Lower portion 45 could also be mounted to pivot relative to upper portion 49 and lock in various angular positions by, for instance, utilizing the structure for such a lockable pivoting relationship taught in U.S. Pat. No. 1,057,582.

As will be appreciated by reference to the figures, contact face 46 of fence body 14 lies parallel to an inboard from plane side contact surface 22. Thus, in a bench plane 12 having a plane side 16 perpendicular to the plane sole 20, surface 46 of fence body 14 is also perpendicular to plane sole 20. As is illustrated in FIG. 1, plane fence 10 thus facilitates formation of an edge 48 of workpiece 50 square to face 52 of workpiece 50 by planing edge 48 while maintaining contact between face 46 of fence body 14 and workpiece face 52. As can be seen in FIG. 5, the offset between face 46 and face 22 of fence body 14 positions face 46 relative to the cutting arris 54 of blade 56 in bench plane 12 so that arris 54 will contact the entire width of edge 48 of workpiece 50.

Even when side 16 of plane 12 is not square to sole 20, an edge 48 square to the face 52 of workpiece 50 may still be produced by positioning the cutting arris 54 blade 56 in plane 20 square to face 46 of fence body 14. Contact face 46 of fence body 14 may, as is shown in the illustrations, comprise a plurality of flat, coplanar surfaces separated by shallow grooves 47. Alternatively, contact face 46 could be continuous.

It is sometimes desirable to produce a workpiece edge, such as edge 56 of workpiece 58 shown in FIG. 5, at an orientation that is not square to an adjacent face of the workpiece such as face 60 of workpiece 58 using the unitary body version of fence 10 depicted in the drawings. In order to do so, a wedge-shaped auxiliary fence member like member 62 shown in FIG. 5 may be used. Such a wedge-shaped auxiliary fence member 62 may be a block of wood and may be secured to face 46 of fence body 14 by passing wood screws through the countersunk holes 64 penetrating plane body 14 and visible in FIGS. 1, 2 and 3 of the drawings. With such an auxiliary fence member 62 in place on fence 14 and in contact with the face 60 of workpiece 58, edge 56 of workpiece 58 maybe formed at an angle to workpiece face 60 determined by the shape of auxiliary fence member 52.

As will be appreciated by reference to the drawings, the jointer fence 10 of this invention may be fabricated in different sizes. However, a fence 10 approximately eleven inches (about 28 centimeters) long is a convenience size for use with all sizes of bench planes with which such an auxiliary fence is typically likely to be desirable, including the bench plane sizes typically referred to by number as numbers 4 through 7. These include bench planes typically referred to by name as jointer or trying planes, fore planes, smoothing planes and jack planes.

Where magnets are used to secure the fence 10 to a plane, various types, sizes and numbers of magnets can be used, and such magnets can be used with or without magnet cups that increase the magnet attraction on the open side of the cup achieved with a particular magnet. Two disk-shaped rare earth magnets 38 three-fourths of one inch (about 1.9 centimeters) in diameter in magnet cups 42 have been found to supply adequate magnetic force for use with a fence 10 approximately eleven inches (about 28 centimeters) long.

As will also be appreciated by reference to the figures, stop screw 24 can be alternatively positioned in threaded holes 26 or 28 depending on the length of the bench plane 12 with which the fence 10 is used and for use on the left side of the bench plane 12 as is shown in FIG. 1. Alternatively, stop screw 24 can be positioned in an appropriate one of holes 30 or 32 for positioning of the fence 10 on the right side of a bench plane such as bench plane 12.

While the use of two disk-shaped rare earth magnets within magnetic cups, as illustrated in the figures, provides an extremely easy method of temporarily and quickly securing fence 10 to a ferromagnetic bench plane 12, other securing means can be used, including means usable with a bench plane having non-ferromagnetic plane body, such as a body made of bronze.

For instance, as an alternative to one or both of the magnets 38, one or more small general purpose "C" clamps could be used to secure the fence, as could a variety of dedicated or special mechanical clamping arrangements. An example, such a usable clamping arrangement is disclosed in U.S. Pat. No. 1,057,582, which incorporated herein by reference.

As another alternative, one or more screws could be passed through the upper portion 49 of fence body 14 and into holes in the side 16 of plane 12. Such screws could be secured with nuts on the inside 64 of side 16 or in threads in the holes in plane 12 side 16. Similarly, bolts passing through fence body 14 could be positioned so that their shanks lie near or against the edge 36 of plane side 16 and a portion of the bolt heads or other clamping fixtures bear against the inside 64 of plane 12 side 16, thereby drawing and clamping fence body 14 against plane side 16.

As is shown in the illustrations, fence body 14 can be a structure having a cross section that is generally uniform across its entire length. This facilitates manufacture of plane body 14 in a highly advantageous manner by utilizing an appropriate length of extruded aluminum having a desired cross sectional shape, such as the shape illustrated in FIG. 4. Such an aluminum fence body 14 may be anodized with an attractive and wear resistant coating. It is not necessary, however, that fence body 14 have such a uniform cross section, and fence body 14 could also be fabricated from metals or alloys other than aluminum and could be manufactured of materials other than metal, such as suitable polymeric and composite compositions.

All such variations of the structures illustrated in the drawings and the materials described above are within the scope and spirit of this invention and the following claims.

What is claimed is:

1. An auxiliary fence for use with a bench plane, the fence comprising:
    (a) a fence body comprising extruded aluminum having a generally planar first face for contact with a side of the bench plane and an integrally farmed reference face for contact with a face of a workpiece, the reference face positioned parallel to and inboard of the first face,
    (b) two ferromagnetic cups threaded into the fence body, and
    (c) two disk-shaped rare earth magnets, one of which is positioned within each magnet cup.

2. The plane fence of claim 1 further comprising a stop projecting from the fence body for contact with the plane.

3. The plane fence of claim 1 wherein the plane body further comprises a reference surface for contact with a sole of a plane.

4. The plane fence of claim 2, wherein the stop comprises a screw selectively positionable in one of a plurality of threaded holes in the fence body.

5. The plane fence of claim 4, wherein the screw comprises a cylindrical head attached to a threaded shank.

* * * * *

UNITED STATES PATENT AND TRADEMARK OFFICE
CERTIFICATE OF CORRECTION

PATENT NO. : 6,708,412 B2
DATED : March 23, 2004
INVENTOR(S) : Saunders et al.

It is certified that error appears in the above-identified patent and that said Letters Patent is hereby corrected as shown below:

Title page,
Item [75], Inventors, address of Inventor, "Terry Ross Saunders" should read
-- North Gower (CA) --

Signed and Sealed this

Third Day of August, 2004

JON W. DUDAS
*Acting Director of the United States Patent and Trademark Office*